United States Patent Office 3,520,819
Patented July 21, 1970

3,520,819
HIGH ENERGY GAMMA RAY SOURCE
Albert E. Litherland, Toronto, and Thomas K. Alexander and Alan T. Jeffs, Deep River, Ontario, Canada, assignors to Atomic Energy of Canada Limited, Ottawa, Ontario, Canada, a corporation of Canada
No Drawing. Filed Sept. 7, 1967, Ser. No. 665,985
Int. Cl. C09k 3/00
U.S. Cl. 252—301.1                           4 Claims

ABSTRACT OF THE DISCLOSURE

A gamma ray source is described in which the capture of energetic alpha particles by certain element nuclei result in an excited state of a daughter element of higher atomic number and which has a sufficiently long life time in that state before decay by gamma radiation, so that the recoil velocity consequent upon the alpha particle absorption makes negligible contribution to broadening of the gamma ray spectrum line.

The source of alpha particles must be energetic and preferably comprises plutonium, curium, or americium and the element used for capture is preferably boron 10 or carbon 13.

---

The present invention relates to radiation sources and in particular to a mono-energetic source of 3.85 m.e.v. gamma rays.

Such a source is particularly useful for the testing of lithium drifted germanium gamma ray detectors since an accurate calibration of the detector at high energy levels is possible.

In general terms, the present invention provides a gamma ray source consisting of a sintered intimate solid mixture of powdered boron 10 and an energetic alpha emitter such as plutonium. The plutonium may be present as plutonium oxide $PuO_2$. Alpha particles emitted by the plutonium react with the nucleus of the boron in an alpha, proton, gamma reaction in which the boron is converted into carbon 13.

A source of mono-energetic 3.85 m.e.v. $\gamma$ rays, and lower energy $\gamma$ rays, has been produced by using $^{10}B(\alpha,p\gamma)^{13}C$ reactions occurring in an intimate mixture of $^{10}B$ and $PuO_2$. The $^{10}B(\alpha,p)^{13}C$ reaction has a Q-value or energy release of 4.07 m.e.v. and the first three excited states at 3.09, 3.68 and 3.85 m.e.v. in $^{13}C$ are populated when Pu $\alpha$ particles are used. The 3.85 m.e.v. level decays to the ground state (76% branch) giving rise to a 3.85 m.e.v. $\gamma$ ray. The other decay is to the 3.68 m.e.v. level.

Although the excited $^{13}C$ nuclei are produced with high recoil velocity ($v/c \simeq 1\%$), the Doppler broadening of the $\gamma$ rays from the 3.85 m.e.v. level is almost completely attenuated since the lifetime ($\tau_m = 7.5 + 3 - 2\,ps$) is long compared to the slowing-down time of the recoils in the solid source material. Thus nearly all the decays from the 3.85 m.e.v. level occur from nuclei at rest.

In accordance with the prior art, a mixture of plutonium and $^9Be$ is known to produce a source of fast neutrons and high energy $\gamma$ rays by the $^9Be(\alpha,n)^{12}C$ reaction. This known source emits 4.43 m.e.v. $\gamma$ rays from carbon 12, however, these $\gamma$ rays are Doppler broadened to a width of $\sim 1\%$ because the $\alpha$ particle direction is undefined and the recoiling carbon 12 ions have not lost their high recoil velocity before they emit the $\gamma$ rays. The large Doppler broadening of a $Pu^9Be$ source makes it unsuitable for testing lithium drifted germanium detectors.

In contrast, the $\gamma$ ray source of the present invention with its 3.85 m.e.v. $\gamma$ ray observed with a 40 cm.³ Ge(Li) detector, has a width of 5.8 k.e.v. (full width at half maximum) which is presumably the system resolution.

In addition, the 24% branch to the 3.68 m.e.v. level is interesting since the 3.68 m.e.v. $\gamma$ rays following the 170 k.e.v. cascade are also mono-energetic. This gives rise to a sharp component and a Doppler broadened component due to direct feeding of the 3.68 m.e.v. level.

The $Pu^{10}B$ 3.85 m.e.v. $\gamma$ ray source of the present invention was prepared in the following manner:

EXAMPLE I 10 g. of $B^{10}$ powder, 3 g. of $PuO_2$ powder (batch FP–376, –200 mesh, calcined at 800° C.), and 130 mg. of Sterotex binding agent (i.e. 1%) were ground together in a new tool steel vial for 1 hour. The mixed powders were then pressed in a 0.90 inch diameter die at 10 kp. s.i. and sintered in a flowing argon atmosphere at temperatures up to 1500° C., then cooled. The density of the sintered pellet was measured as 1.84 g./cm.³ which was less than the theoretical maximum density.

EXAMPLE II

The sintered pellet of Example I was ground in a vibratory mixer mill using five grinding cycles of 30 mins. each. The ground powder was pressed in a 0.90 inch diameter die at a higher pressure of 50 kp. s.i., and then sintered in flowing argon atmosphere at 1600° C. for 2 hours then cooled.

Finally one face of the sintered pellet was polished using 2 $\mu$m. diamond. An $\alpha$ autoradiograph was taken using cellulose nitrate through .00025″ Pt foil.

Pellet data: Diameter 2.292 cm., length 1.679 cm., volume 6.927 cm.³, weight 13.16 g., measured density 1.90 g./cm.³ (theoretical density is $\sim$2.40 g./cm.³).

Activity measurements: $\gamma$ 30.0 mr./h., $\beta$ 0.3 Rad, Neutron counts $22.4 \times 10^3$ c.p.m.

These results were obtained with a sintered 10 g. $^{10}$B-3 g. $PuO_2$ source fabricated in the plutonium laboratory at Chalk River, Canada. There appeared to be scope for development to raise the yield of $^{13}C$ by improvements in density, particle size and the possible substitution of $^{241}Am$ or $^{238}Pu$ as the source of $\alpha$ particles. Several sources using $^{241}Am$ as the $\alpha$ particle emitter were then fabricated and have proved satisfactory.

With the increased $\alpha$ particle energy available it is energetically possible to populate the 6.13 m.e.v. level in $^{16}O$ using the $^{13}C(\alpha,n)^{16}O$ reaction in a similar type of source. The lifetime of the 6.13 m.e.v. level is $25\pm 2$ $ps$ and decays by a 6.13 m.e.v. $\gamma$ ray making this reaction suitable for producing a mono-energetic 6.13 m.e.v. $\gamma$ ray.

The main uses of the $Pu^{10}B$ source of the present invention are the testing of the energy resolution and performance of Ge(Li) detectors, energy calibrations up to 3.85 m.e.v. and calibrations of detector efficiency at 3.85 m.e.v.

It is a considerable advantage to have a convenient source of mono-energetic $\gamma$ rays at 3.85 m.e.v. to measure the energy resolution of Ge(Li) detectors. Charge collection efficiency in the detector and gain instabilities in the electronics are both percentage effects and therefore as the energy of the $\gamma$ ray is high, the quality of the Ge(Li) detector and its associated electronics are more critically tested.

The 3.85 m.e.v. full energy peak can be easily calibrated with precision using existing sources since the $E_\gamma - 2m_0c^2$ peak lies 1022 k.e.v. lower in energy. At present, the most accurate value of the energy of the $\gamma$ ray is $3854\pm 1$ k.e.v. The 3.85 m.e.v. line can then be used as an energy calibration in experiments involving high energy $\gamma$ rays.

Since the source of 3.85 m.e.v. $\gamma$ rays is long lived, the relative intensity of the $\gamma$ rays from the source remains fixed. Once the intensities are calibrated for a fixed geometry, the source can be used to measure the efficiency of Ge(Li) detectors; the fact that the 3.85 m.e.v. line is sharp increases the accuracy with which this can be done.

Previously, reactions induced by beams of particles from accelerators had to be used for the test and calibration procedures. The use of a Pu $^{10}$B source is more convenient and less expensive. It will be understood that the Pu $^{10}$B source need not be sinterized, but this ensures durability strength and maintenance of size and shape.

We claim:

1. A gamma ray source for emitting essentially mono-energetic gamma rays comprising an intimate mixture of a substance selected from the group consisting of boron 10 and carbon 13; and an emitter of $\alpha$ particles selected from the group consisting of plutonium 239, plutonium 238, curium, and americium 241, and oxides thereof, said substance being combined with said emitter of $\alpha$ particles in the ratio of about 10:3.

2. A gamma ray source comprising an intimate solid mixture of boron 10 and an energetic $\alpha$ emitter selected from the group consisting of plutonium 239, plutonium 238, curium, and americium 241 and oxides thereof, said boron 10 being present in the ratio of about 10 parts boron 10 to 3 parts $\alpha$ emitter.

3. A source of mono-energetic 3.85 m.e.v. gamma rays, comprising a sintered pellet formed of an intimate mixture of boron 10 and plutonium oxide, said mixture containing about 10 parts boron 10 to 3 parts plutonium oxide.

4. A source of $\gamma$ rays according to claim 3 containing 10 grams of boron 10, and 3 grams of $PuO_2$ and 130 milligrams of a sintering binding agent.

References Cited

UNITED STATES PATENTS

| 3,320,176 | 5/1967 | Davis | 252—301.1 |
| 3,360,477 | 12/1967 | Acree et al. | 252—301.1 |
| 3,361,857 | 1/1968 | Rose | 252—301.1 X |

OTHER REFERENCES

Atomic Energy of Canada Limited, Technical Bulletin NS-1, "Neutron Sources and Their Characteristics," July 21, 1961, pp. 1–7.

CARL D. QUARFORTH, Primary Examiner

M. J. SCOLNICK, Assistant Examiner